(12) United States Patent
Koshita et al.

(10) Patent No.: US 9,273,372 B2
(45) Date of Patent: Mar. 1, 2016

(54) METHOD FOR MANUFACTURING STABILIZER, AND HEATING DEVICE

(71) Applicant: NHK SPRING CO., LTD., Yokohama-shi, Kanagawa (JP)

(72) Inventors: Yoshihiro Koshita, Kanagawa (JP); Yutaka Wakabayashi, Kanagawa (JP); Kosuke Takeo, Kanagawa (JP); Koichi Ito, Kanagawa (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 0 days.

(21) Appl. No.: 14/423,941

(22) PCT Filed: Aug. 1, 2013

(86) PCT No.: PCT/JP2013/070921
§ 371 (c)(1),
(2) Date: Feb. 25, 2015

(87) PCT Pub. No.: WO2014/034375
PCT Pub. Date: Mar. 6, 2014

(65) Prior Publication Data
US 2015/0184267 A1 Jul. 2, 2015

(30) Foreign Application Priority Data

Aug. 28, 2012 (JP) .................................. 2012-187651

(51) Int. Cl.
*C21D 9/08* (2006.01)
*B60G 21/055* (2006.01)
*C21D 1/40* (2006.01)
(Continued)

(52) U.S. Cl.
CPC ................ *C21D 9/08* (2013.01); *B60G 21/055* (2013.01); *C21D 1/40* (2013.01); *C21D 9/0068* (2013.01); *C22C 38/00* (2013.01);
(Continued)

(58) Field of Classification Search
CPC ........... C21D 9/08; C21D 9/0075; C21D 1/40
See application file for complete search history.

(56) References Cited

FOREIGN PATENT DOCUMENTS

| JP | 57-134520 | 8/1982 |
| JP | 05-156346 | 6/1993 |
| JP | 05-271750 | 10/1993 |
| JP | 2011-189892 | 9/2011 |

OTHER PUBLICATIONS

Machine translation of JP05271750, 1993.*

* cited by examiner

*Primary Examiner* — Rebecca Lee
(74) *Attorney, Agent, or Firm* — Rankin, Hill & Clark LLP (57) ABSTRACT

Provided are a method for manufacturing a stabilizer and a heating device, the method being able to suppress the occurrence of unevenness in the hardness of a curved portion of a semimanufactured product of the stabilizer and reduce the process time in a tempering process. In electric heating in a first heating step (step A), the temperature of an inside portion of a shoulder can be steeply increased to a temperature (<UA) close to a target temperature (UA) by continuously passing an electric current. In electric heating in a second heating step (step C), the temperature difference between the maximum achieved temperature of the inside portion of the shoulder and the maximum achieved temperature of an outside portion thereof can be decreased by intermittently passing an electric current, thereby making it possible to set the maximum achieved temperatures to a desired target temperature (UA) or a temperature close thereto. In the outside portion, a tempered structure similar or approximately similar to that of the inside portion can be obtained.

2 Claims, 8 Drawing Sheets

(51) Int. Cl.
*C22C 38/00* (2006.01)
*C21D 9/00* (2006.01)
*C21D 9/02* (2006.01)
*C21D 1/18* (2006.01)

(52) U.S. Cl.
CPC ...... *B60G 2202/135* (2013.01); *B60G 2206/80* (2013.01); *B60G 2206/81062* (2013.01); *C21D 1/18* (2013.01); *C21D 9/0075* (2013.01); *C21D 9/02* (2013.01)

METHOD FOR MANUFACTURING STABILIZER, AND HEATING DEVICE

TECHNICAL FIELD

The present invention relates to a method for manufacturing a stabilizer having curved parts, such as a shoulder part, and a heating device, and particularly relates to improving technology for tempering by current application heating.

BACKGROUND ART

Figure 1:
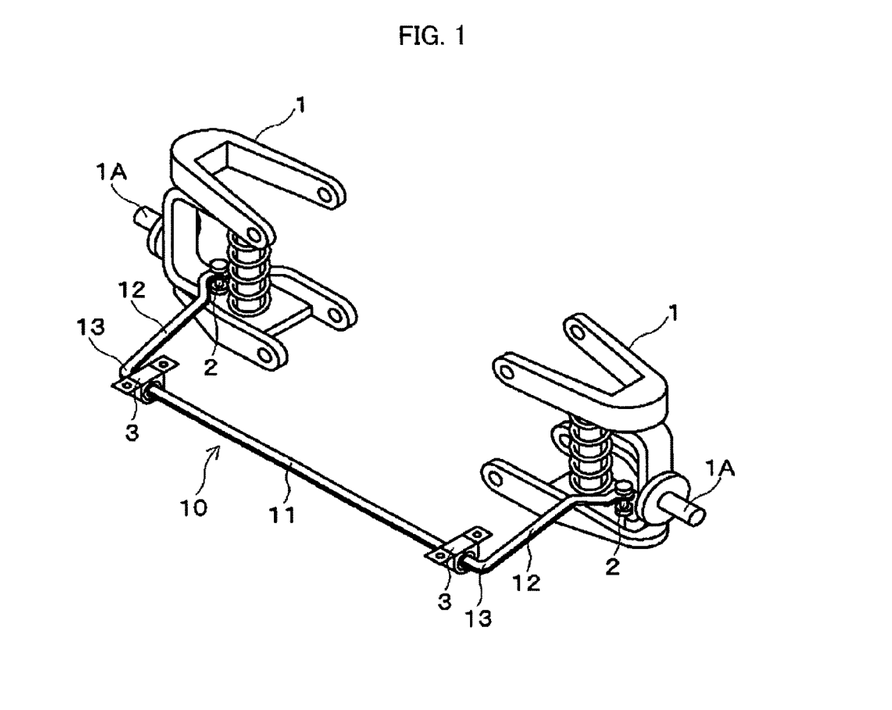
FIG. 1 is a perspective view showing the structure of a stabilizer connected to the suspensions of a vehicle.

A stabilizer used for a vehicle such as an automobile is a device for ensuring the roll stiffness of the vehicle. FIG. 1 is a perspective view showing the structure of a stabilizer connected to the suspensions of a vehicle. A stabilizer 10 includes, for example, a torsion part 11, arm parts 12, and shoulder parts 13, and is substantially in a U-shape. The stabilizer 10 is arranged such that the torsion part 11 is fitted to a vehicle body (not shown) through bushes 3, and the tip end portions of the arm parts 12 are connected to suspensions 1 through stabilizer links 2. Incidentally, tires are fitted to the left and right axle portions 1A of the suspension 1.

In a process of manufacturing a stabilizer, heat treatment, such as quenching and tempering, is performed on a half-finished stabilizer having a torsion part, arm parts, and shoulder parts. Tempering has conventionally been performed in a furnace by heating a half-finished stabilizer. To take the place of such a tempering process, a tempering process by performing current application heating of a half-finished stabilizer is presented. To perform current application heating of a half-finished stabilizer, the entire half-finished stabilizer is heated by providing electrodes at the end portions of the left and right arm parts and applying current between electrodes.

However, while performing current application heating of a half-finished stabilizer, current tends to flow along the shortest route of the half-finished stabilizer. If the half-finished stabilizer has a curved part, such as a shoulder part, as the inner portion of the curved part forms the shortest route shorter than the outer portion of the curved part, current tends to flow not in the outer portion of the curved part but in the inner portion of the curved part. Accordingly, the inner portion of the curved part is heated more than the outer portion of the curved part and the temperature becomes higher at the inner portion of the curved part than at the outer portion of the curved part during tempering. Thus, a significant difference in temperature occurs between the inner portion and the outer portion of the curved part in the tempering, and the hardness of the half-finished stabilizer after the tempering becomes significantly different between the inner portion and the outer portion of the curved part. As a result, the irregularity of hardness in the half-finished stabilizer becomes significant, and a difference in the mechanical characteristic occurs between these portions. This problem of irregularity of mechanical characteristic in a half-finished stabilizer is serious in a case of a stabilizer product using a hollow member.

In this situation, in order to decrease the temperature difference between the inner portion and the outer portion of the curved part of a half-finished stabilizer during current application heating, using the technology disclosed by Patent Document 1 may be considered. In the technology disclosed by Patent Document 1, a current application heating process is performed to perform burning coating, and it is presented that, by controlling the rate of temperature rise, setting the rate within a range 10-30° C./sec, before the burning coating in the current application heating process, the temperature difference between the inner portion and the outer portion of the curved part of a half-finished stabilizer can be decreased. In this case, the inner portion of the curved part of the half-finished stabilizer is locally cooled.

RELATED ART DOCUMENT

Patent Document

Patent Document 1: Japanese Patent Application Publication No. 2011-189892

DISCLOSURE OF THE INVENTION

Problem to be Solved by the Invention

However, in the technology disclosed by Patent Document 1, in order to decrease the temperature difference between the inner portion and the outer portion of the curved part in the current application heating process, it is necessary to reduce the rate of temperature rise of the half-finished stabilizer. Consequently, shortening the time of the process cannot be attained if the technology disclosed by Patent Document 1 is applied to the tempering process.

An object of the invention is to provide a stabilizer manufacturing method that enables, not only of course reducing occurrence of irregularity of hardness at the curved parts of a half-finished stabilizer in a tempering process, but also shortening the time of process, and to provide a heating device.

Means for Solving the Problem

In order to solve the problem with the technology disclosed by Patent Document 1, based on an idea different from the technology disclosed by Patent Document 1 that reduces the rate of temperature rise of a half-finished stabilizer in the whole current application heating process, the inventors have discussed about positively using occurrence of the above-described temperature difference due to current application heating. As a result, the inventors have discovered that, after a first heating process that continuously flows current in a half-finished stabilizer in current application heating, by performing a second heating process that intermittently flows current in the half-finished stabilizer, the temperature difference at the curved parts having occurred in the first heating process can be decreased, and have come to thereby complete the present invention.

A method for manufacturing a stabilizer having a curved part, the method according to the present invention, includes: a tempering process for performing tempering of a half-finished stabilizer by current-application heating, wherein a first heating process and a second heating process are sequentially performed in the tempering process, wherein current-application heating is performed on the half-finished stabilizer by continuously flowing current in the half-finished stabilizer in the first heating process, and wherein current application heating is performed on the half-finished stabilizer by intermittently flowing current in the half-finished stabilizer in the second heating process.

In a stabilizer manufacturing method according to the present invention, the first heating process and the second heating process are sequentially performed in the tempering process. In the tempering process, based on the kind of steel, the tempered structure planned to be formed, the required hardness, and the like of a half-finished stabilizer, it is possible to set a target tempering temperature, and perform the first heating process and the second heating process so that the respective highest reached temperatures at the inner portion and the outer portion of a curved part become the preset target tempering temperature or a temperature close to it.

Concretely, in the first heating process, current application heating is performed on a half-finished stabilizer by continuously applying current to a half-finished stabilizer so as to raise the temperature of the half-finished stabilizer at a rapid rate of temperature rise. By this first heating process, the temperature at the inner portion of a curved part, which forms the shortest route of current, can be rapidly raised up to a desired target tempering temperature or a temperature close to it. On the other hand, a significant difference in temperature has occurs between the inner portion and the outer portion of the curved part of the half-finished stabilizer. After current application heating in the first heating process, heat transfer occurs from the inner portion, which is a portion with a high temperature, of the curved part to surrounding portions. Accordingly, heat transfer occurs from the inner portion of the curved part to the outer portion of the curved part, which is a surrounding portion, so that the temperature of the outer portion of the curved part rises.

However, heat transfer from the inner portion of the curved part, which is a portion with a high temperature, has a limit and is not sufficient to raise the temperature of the outer portion of the curved part enough. For example, in case of not performing heating after the first heating process, the temperature difference between the inner portion and the outer portion of a curved part becomes smaller. However, as temperature begins to drop not only at the inner portion but also at the outer portion of the curved part in a state that a comparatively large difference in temperature between the inner portion and the outer portion of the curved part is remaining, the temperature of the outer portion of the curved part cannot reach a desired target tempering temperature. In case of performing current application heating by continuously applying current similarly to the first heating process after the first heating process, the temperature difference between the inner portion and the outer portion of the curved part again becomes large.

On the other hand, in a stabilizer manufacturing method according to the present invention, current application heating is performed in the second heating process after the first heating process by intermittently applying current to a half-finished stabilizer, and it is thereby possible to maintain the inner portion of a curved part at the temperature after the first heating process (the target tempering temperature or a temperature close to it), or make the inner portion of the curved part gradually become close to the target tempering temperature. During current application heating by intermittent current in the second heating process, in addition to the temperature raising action by heat transfer from the inner portion of the curved part, the temperature raising action by the current application heating by the intermittent current works on the outer portion of the curved part. Consequently, the rate of temperature rise becomes higher than that of the inner portion of the curved part. Thereby, it is possible to make the highest reached temperature of the outer portion of the curved part at the time of completion of the second heating process become close to the highest reached temperature of the inner portion of the curved part. As a result, the temperature at the outer portion of the curved part also rises up to the target tempering temperature or a temperature close to it. Incidentally, the time when the temperature of the inner portion of the curved part becomes the highest reached temperature may be either in the first heating process or in the second heating process.

The tempering process by a stabilizer manufacturing method according to the present invention, as described above, makes it possible to make the temperature difference between the highest reached temperature of the inner portion of the curved part and the highest reached temperature of the outer portion of the curved part small, and make these highest reached temperatures a desired target tempering temperature or a temperature close to it. As a result, at the outer portion of a curved part, hardness and a tempered structure, which are the same as or similar to those at the inner portion of the curved part, can be obtained. In such a manner, occurrence of irregularity of the hardness at a curved part can be reduced. Further, the highest reached temperature of the inner portion where a high stress is generated during usage does not become exceedingly high from the target tempering temperature so that the inner portion becomes desirably hard and does not become soft. Accordingly, a stabilizer in the present invention has a high durability.

As the above-described effect can be obtained by performing current application heating, a large reduction in the process time is enabled, differently from a conventional tempering process using a furnace. Further, in the case of a conventional tempering process using a furnace, a time of waiting for transition to a temperature steady state is necessary when a preset temperature in the furnace is changed. Differently from this case, by a stabilizer manufacturing method according to the present invention, a preset tempering temperature can be easily changed for individual half-finished stabilizers, without such a waiting time. Thus, the process time can be further shortened, and a stabilizer manufacturing method according to the present invention enables easy handling of half-finished stabilizers with different target temperatures. Further, current application heating can be controlled by using the electric power amount necessary for current application heating as a control parameter. Thus, differently from a conventional temperature control, occurrence of overshoot in which the temperature of a half-finished stabilizer exceeds a target tempering temperature can be easily reduced. Particularly, for the current application heating in the first heating process in which the temperature of a half-finished stabilizer can be rapidly raised at a rapid rate, control using an electric power amount is suitable.

Besides, for example, in the current application heating in the first heating process, differently from the technology disclosed by Patent Document 1, it is not necessary to reduce the rate of temperature rise of a half-finished stabilizer, and the temperature of the half-finished stabilizer can be rapidly raised at a rapid rate so that further shortening of the process time is possible. As it is possible to make it unnecessary to perform local cooling at the inner portion of a curved part of a half-finished stabilizer, control using an electric power amount can be easily performed. Further, as it is possible to make a cooling device unnecessary, and a wasteful electric power for a cooling device becomes unnecessary, it is possible to attain reduction in power consumption.

A heating device used to manufacture a stabilizer having a curved part, the heating device according to the present invention, includes: a pair of electrodes fixed to both end portions of a half-finished stabilizer; and a power supply source connected to the pair of electrodes to supply the pair of electrodes an output corresponding to a control signal, wherein tempering is performed on the half-finished stabilizer by applying current between the electrodes, and wherein, current-application heating is performed on the half-finished stabilizer by continuously flowing current between the electrodes in the tempering, and current application heating is subsequently performed on the half-finished stabilizer by intermittently flowing current between the electrodes.

By a heating device according to the present invention, the current application heating tempering process of a stabilizer manufacturing method according to the present invention can be carried out.

Advantages of the Invention

By a stabilizer manufacturing method or a heating device according to the present invention, effects can be obtained including reduction in occurrence of irregularity of hardness at the curved parts of a half-finished stabilizer in a tempering process.

EMBODIMENT FOR CARRYING OUT THE INVENTION (1) Stabilizer Manufacturing Method

Figure 2:
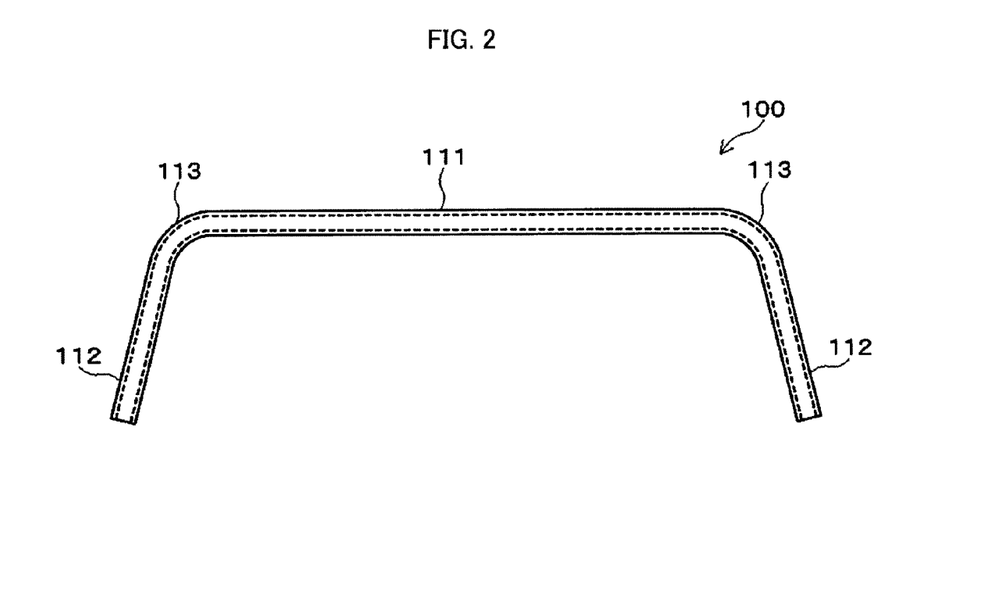
FIG. 2 is a diagram showing the schematic structure of a stabilizer in an embodiment of the present invention.
Figure 3:
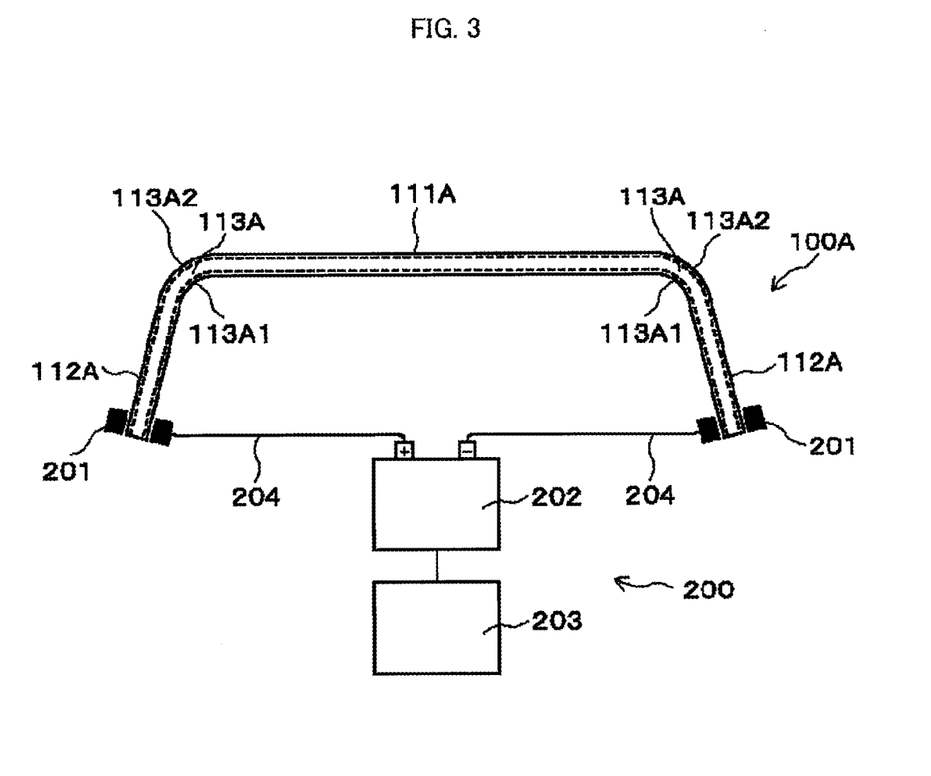
FIG. 3 is a diagram showing the schematic structure of a heating device used in the tempering process of a stabilizer manufacturing method in an embodiment of the present invention, and shows a state that a half-finished stabilizer, which is a material for a stabilizer, is provided on the heating device.

An embodiment of the present invention will be described below, referring to the drawings. FIG. 2 shows an example of the structure of a stabilizer obtained by a manufacturing method in an embodiment of the present invention. FIG. 3 shows the schematic configuration of a heating device used in the tempering process of a stabilizer manufacturing method in an embodiment of the present invention. A stabilizer 100 is, for example, as shown in FIG. 2, a hollow stabilizer substantially in a U-shape having a torsion part 111, arm parts 112, and shoulder parts 113 (curved part).

In the present embodiment, the tempering process, which is the main heat treatment process in the present invention, will be described in detail, and description of the other processes will be briefed. In manufacturing a stabilizer 100, for example, a hollow member preparation process, a bending process, and a heat treatment process are sequentially performed. In the hollow member preparation process, for example, a hollow member such as an electric resistance welded tube with a predetermined length made from steel is formed, and in the bending process, for example, the hollow member is subjected to bending processing. Thus, as shown in FIG. 3, obtained is a half-finished stabilizer 100A having a torsion part 111A, arm parts 112A, and shoulder parts 113A (curved parts). Reference symbol 113A1 represents the inner portions of the shoulder parts 113A, and reference symbol 113A2 represents the outer portions of the shoulder parts 113A. In the heat treatment process, for example, a quenching process and a tempering process are performed on the half-finished stabilizer 100A. Subsequently, a shot-peening process, a coating process, and the like, are performed, as necessary, and a stabilizer 100 is thus obtained.

(2) Tempering Process

In the tempering process in the present embodiment, the first heating process and the second heating process by current application heating are sequentially performed. In the current-application heating in the first heating process, a current is continuously applied to the half-finished stabilizer 100A, and in the current-application heating in the second heating process, a current is intermittently applied to the half-finished stabilizer 100A. The heating device and the current-application heating method adopted in the present embodiment will be described below.

(A) Heating Device

For the current-application heating in the first heating process and the second heating process, for example, a heating device 200 shown in FIG. 3 is used. The heating device 200 is provided with a pair of electrodes 201, a power supply source 202, and a control section 203. The pair of electrodes 201 clamps the both end portions of the half-finished stabilizer 100A, and is for example electrodes for performing current-application heating of the entire half-finished stabilizer 100A. The power supply source 202 and the pair of electrodes 201 are connected for example by current application wires 204. The power supply source 202 is for example a switching power supply source, and applies an output, which is electrically amplified from an output signal from the control section 203, to the pair of electrodes 201. By applying a certain voltage between the pair of electrodes 201, the entire half-finished stabilizer 100A can be heated.

(B) Current Application Heating Method

Figure 4A:
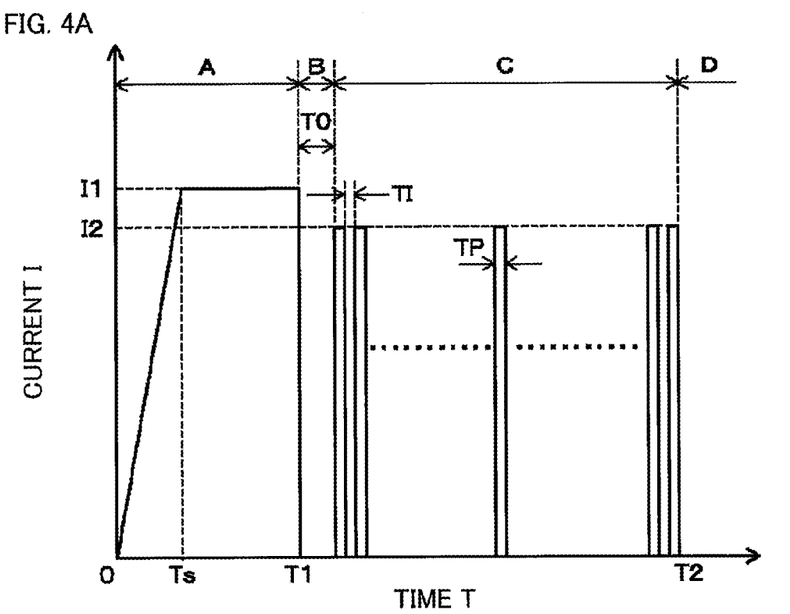
FIG. 4A is a diagram showing an example of a current applying pattern with respect to current applying time, according to the current application heating method of the stabilizer manufacturing method in an embodiment of the present invention.
Figure 4B:
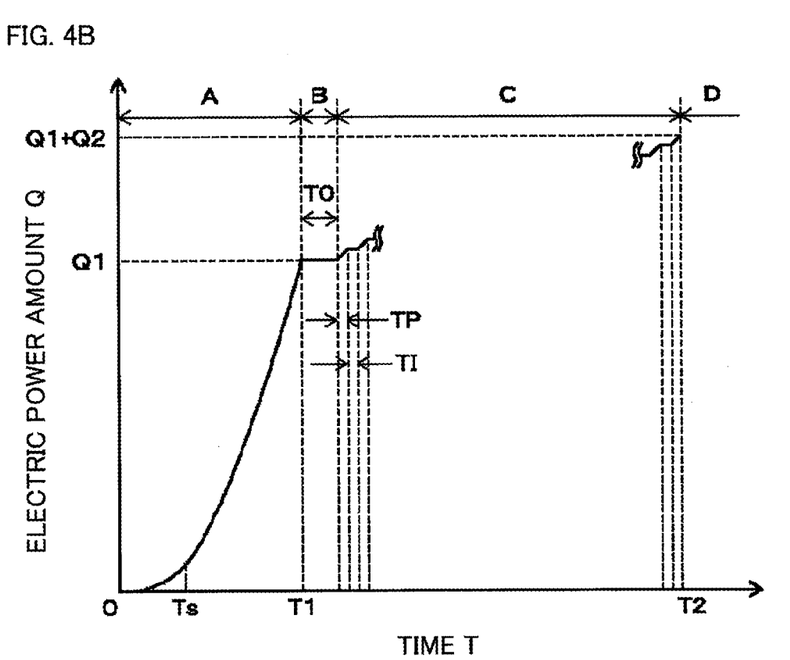
FIG. 4B is a diagram showing the change in the applied electric power amount with respect to the current application heating time, corresponding to the current applying pattern in FIG. 4A, according to the current application heating method of the stabilizer manufacturing method in an embodiment of the present invention.
Figure 5:
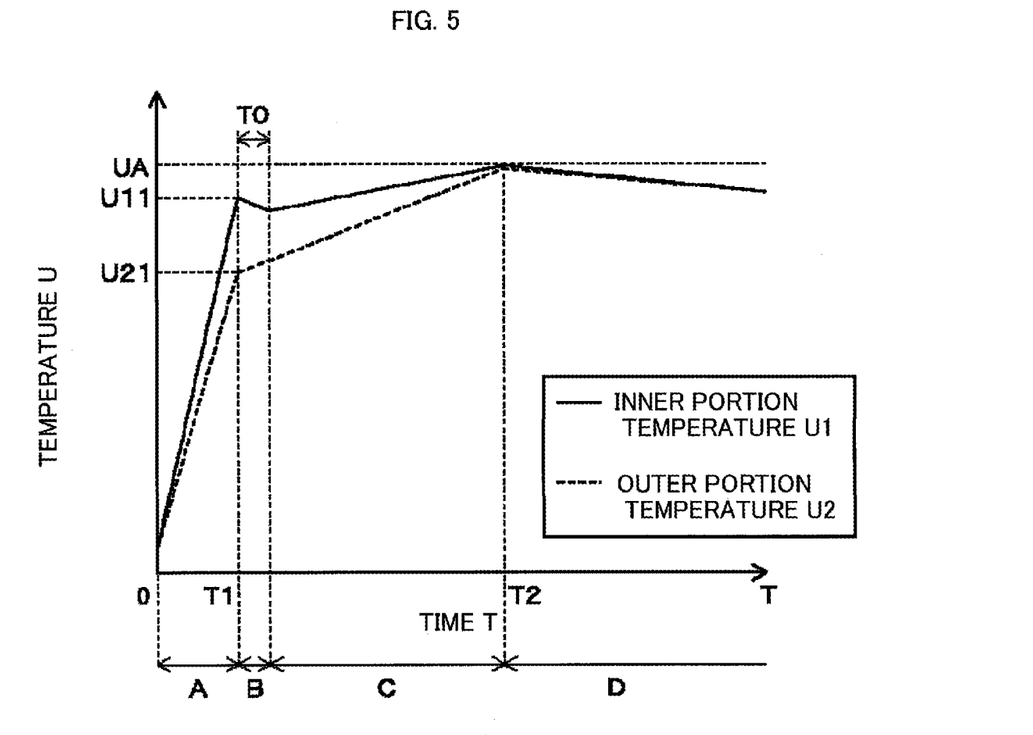
FIG. 5 is a diagram for illustration of the temporal change in the temperature of a half-finished stabilizer by a current application heating method of a stabilizer manufacturing method in an embodiment of the present invention, and shows an example of the temporal change in the temperatures of the inner portion and the outer portion of a shoulder part.

The current-application heating method in the tempering process will be described, referring to FIGS. 4A, 4B, and 5. FIGS. 4A and 4B are diagrams for illustration of the current-application heating method in the tempering process, wherein FIG. 4A is a diagram showing an example of a current application pattern with respect to current application time. FIG. 4B is a diagram showing the change in the applied electric power amount with respect to the current application time, corresponding to the current application pattern in FIG. 4A. FIG. 5 is a diagram for illustration of the temporal change in the temperatures of a half-finished stabilizer by the current application heating method, and shows a concrete example of the temporal change in the temperatures of the inner portion and the outer portion of a shoulder part. In FIGS. 4A, 4B, and 5, reference symbol A represents a first heating process, reference symbol B represents a current-application-off process, reference symbol C represents a second heating process, and reference symbol D represents a cooling process. Incidentally, in FIG. 4A and FIG. 4B, a part of process C is simplified in drawing for the convenience of drawing.

In the tempering process, based on the kind of steel, the tempered structure planned to be formed, the required hardness, and the like of the half-finished stabilizer 100A, a target tempering temperature UA is set. In the tempering process, the first heating process and the second heating process are sequentially performed so that the respective highest reached temperatures at the inner portion 113A1 and the outer portion 113A2 of the shoulder part 113A become the preset target tempering temperature UA or a temperature close to it. As described below, the first heating process and the second heating process can be more suitably managed in terms of electric power amount than in terms of time. Concretely, in the respective processes, performing control such as to terminate current application when the electric power amount has reached a predetermined value is more suitable than performing control such as to terminate current application when a predetermined time has elapsed.

In the first heating process (process A), for example, by continuously applying voltage between the pair of electrodes 201, current is continuously flowed in the half-finished stabilizer 100A. Concretely, for example as shown in process (A) in FIG. 4A, first, current is linearly increased in a slope time length Ts until the current value becomes I1. Thus, as the electrical contact between the pair of electrodes 201 and the half-finished stabilizer 100A can be stabilized, it is possible to prevent occurrence of sparks. Then, for example as shown process (A) in FIG. 4A, a current of a constant current value I1 is applied from time TS to time T1. In this case, for the electric power amount Q shown in FIG. 4B, for example, if the resistance of the material of the half-finished stabilizer 100A is substantially constant and further the current I increases linearly with respect to time from time 0 to time TS, the curve of the electric power amount Q becomes for example a quartic curve of time T.

In the first heating process, electric power amount Q1, current value I1, and slope time length TS caused by current application are appropriately set, and the first heating process can be managed more suitably in terms of electric power amount, for example as shown in process (A) in FIG. 4B, than in terms of time. Particularly, in the first heating process in which the temperature is raised at a rapid rate as described below, management in terms of electric power amount is preferable in order to reduce occurrence of overshoot in which the temperature of the shoulder part 113A of the half-finished stabilizer 100A exceeds the target tempering temperature UA.

In the first heating process, by appropriately setting the above-described parameters, for example as shown in FIG. 5, the temperature U1 of the inner portion 113A1 can be raised at a rapid rate up to the temperature U11 (<UA) in the vicinity of the target tempering temperature UA. In this case, for example, the rate of temperature rise of the inner portion 113A1 can be set higher than or equal to 35° C./sec (for example, in a range 35° C./sec to 50° C./sec).

On the other hand, the temperature U2 of the outer portion 113A2 becomes a temperature U21 lower than the temperature U11 of the inner portion 113A1, which becomes the shortest route of current. In this manner, at the completion of the first heating process, a comparatively large temperature difference (=U11−U21) has occurred between the inner portion 113A1 and the outer portion 113A2. After the first heating process, as a comparatively significant temperature difference has occurred as described above, heat transfer is performed from the inner portion 113A1, which is a high temperature portion, to the outer portion 113A2, which is a low temperature portion, so that the temperature difference between the inner portion 113A1 and the outer portion 113A2, which is the surrounding portion of the inner portion 113A1, becomes small.

The current-application-off process (process B, time length TO) may be set or not, during the time from a completion of the first heating process to a start of the second heating process. In case the current-application-off process is provided, as heat is transferred from the inner portion 113A1, which is a high temperature portion, to the surrounding portion, the temperature U1 of the inner portion 113A1 drops, and the temperature of the outer portion 113A2 is maintained or raised. As a result, the temperature difference between the inner portion 113A1 and the outer portion 113A2 surrounding the inner portion 113A1 becomes smaller.

In the second heating process (process C), for example as shown in the process (C) in FIG. 4A, by intermittently applying a voltage between the pair of electrodes 201, a current is intermittently flowed in the half-finished stabilizer 100A. Concretely, a pulse current (pulse width TP, current value I2) is repeatedly flowed at a pulse interval T1. In the second heating process, for example as shown in process (C) in FIG. 4A and FIG. 4B, an electric power amount Q2, a current value I2, a pulse interval T1, and a pulse width TP due to current application are appropriately set, and the second heating process is managed by electric power amount, for example as shown in process (C) in FIG. 4B, which is more suitable than managing the second heating process in terms of time T.

In the second heating process, the temperature U1 of the inner portion 113A1 is, for example as shown in FIG. 5, gradually becomes close to the target tempering temperature UA, becomes the highest reached temperature U12, for example, to be substantially the same as the target tempering temperature UA. In this case, in addition to the temperature raising action by heat transfer, the temperature raising action by the current application heating by the intermittent current works on the outer portion 113A2. Consequently, for example as shown in FIG. 5, the rate of temperature rise of the outer portion 113A2 becomes higher. The temperature U2 of the outer portion 113A2 at the time of completion of the second heating process becomes the highest reached temperature U22 to be, for example, substantially the same as the highest reached temperature U12 of the inner portion 113A1.

After the second heating process, the half-finished stabilizer 100A is cooled (process D) by air cooling or water cooling. As a result of the above-described tempering, a desired tempered structure is obtained. The tempered structure contains martensite and the like.

Incidentally, although a current application heating method has been described with reference to FIGS. 4A, 4B and 5, a current application heating method for a stabilizer manufacturing method according to the invention is not limited to the above-described current application heating method, wherein various changes and modifications can be made in the tempering process within a range where the highest reached temperatures of the inner portion 113A1 and the outer portion 113A2 become the target tempering temperature UA or a temperature close to it. In this case, for example, arrangement is preferably made such that the highest reached temperatures of the inner portion 113A1 and the outer portion 113A2 become within a range from −20° C. to +10° C. relatively to the target tempering temperature UA having been determined corresponding to the kind of steel or the like (in other words, $(UA-20)° C. \leq$ highest reached temperature $\leq (UA+10)° C.$).

In the above-described embodiment, for example, in the first heating process, the temperature U1 of the inner portion 113A1 was set to a temperature U11 lower than UA, and in the second heating process after the current-application-off process, the temperature U1 of the inner portion 113A1 was raised substantially up to the target tempering temperature UA, however, the invention is not limited thereto. For example, arrangement may be made such that, in the first heating process, the temperature U1 of the inner portion 113A1 is set to a temperature close to the target tempering temperature UA, and without performing the current-application-off process, the temperature U1 of the inner portion 113A1 is maintained in the second heating process at a temperature close to the target tempering temperature UA to become substantially constant. Further, arrangement may be made such that, for example, in the first heating process, the temperature U1 of the inner portion 113A1 is set such as to become higher than the target tempering temperature UA, and in the current-application-off process and the second heating process, the temperature U1 of the inner portion 113A1 is set such as to become close to the target tempering temperature UA. Incidentally, the temperature of the inner portion 113A1 may become the highest reached temperature U12 either in the first heating process or the second heating process.

As described above, in the present embodiment, in the current-application heating in the first heating process, by continuously applying current to the half-finished stabilizer 100A, the temperature U1 of the inner portion 113A1 can be rapidly raised at a rapid rate up to a temperature U11 close to the target tempering temperature UA (U11<UA). In the current-application heating in the second heating process, by intermittently applying current to the half-finished stabilizer 100A, the temperature difference between the highest reached temperature U12 of the inner portion 113A1 of the shoulder part 113A and the highest reached temperature U22 of the outer portion 113A2 can be made small so that these highest reached temperatures U12, U22 can be set to a desired target tempering temperature UA or a temperature close to it. As a result, the outer portion 113A2 of the shoulder part 113A can be made to have a hardness and a tempered structure similarly to or substantially the same as those of the inner portion 113A1.

In such a manner, the stabilizer manufacturing method in the present embodiment enables reduction in occurrence of irregularity of hardness of the shoulder part 113A. Further, the highest reached temperature U12 of the inner portion 113A1, in which high stress occurs during usage, does not become excessively high from the target tempering temperature UA. As a result, the inner portion 113A1 has a desired hardness and does not soften, having a high durability.

By the stabilizer manufacturing method in the present embodiment, as the above-described effects can be obtained by current-application heating, it is possible to reduce a significant shortening of the process time, differently from a conventional tempering process using a furnace. Further, in case of changing a preset temperature for an individual half-finished stabilizer 100A, a conventional tempering process using a furnace requires a waiting time for transition into a temperature steady state when a preset temperature in the furnace is changed. However, by the stabilizer manufacturing method in the present embodiment, a preset temperature can be easily changed for an individual half-finished stabilizer 100A without such a waiting time. Accordingly, the process time can be further shortened, and it is possible to easily match with tempering of half-finished stabilizers 100A with different target tempering temperatures UA. Further, as current-application heating can be controlled by using the electric power amount necessary for current-application heating as a control parameter, it is possible to easily reduce occurrence of overshoot that exceeds the tempering temperature, differently from conventional thermal control. Particularly, for current-application heating in the first heating process, which enables raising the temperature of a half-finished stabilizer 100A at a rapid rate, control using the electric power amount is suitable.

Besides, for current-application heating in the first heating process for example, differently from the technology disclosed by Patent Document 1, it is not necessary to reduce the rate of temperature rise of the half-finished stabilizer 100A, and the temperature of the half-finished stabilizer 100A can be easily raised at a rapid rate. In this case, for example, the rate of temperature rise of the inner portion 113A1 can be set higher than or equal to 35° C./sec (for example, from 35° C./sec to 50° C./sec). As a result, the process time can be further shortened. Further, as it is possible to make unnecessary local cooling of the inner portion 113A1 of the shoulder part 113A of the half-finished stabilizer 100A, the electric power can be easily controlled. Further, a cooling device is unnecessary and wasteful electric power is also unnecessary, which enables reduction in the power consumption in the tempering process of the half-finished stabilizer 100A.

Embodiment Example

Embodiment of the present invention will be described in further detail below, referring to a concrete embodiment example. In the embodiment example, tempering was performed on a half-finished stabilizer by current-application heating, and thereby obtained were data of temperature rise at a shoulder part of the half-finished stabilizer during current-application heating, data of hardness after the current-application heating, and a photograph of cross-sectional structure after the current-application heating, and then the shoulder part was evaluated.

(1) Conditions of Current Application

In the present inventive example 11, a sample according to the present embodiment was obtained by performing current-application heating on a half-finished stabilizer in the first heating process and the second heating process in embodiment. On the other hand, in a comparative example 11, a comparative sample was obtained by performing current-application heating on a half-finished stabilizer only in the first heating process. The present invention can be applied to any kind of steel, and in both the present inventive example 11 and the comparative example 11, a kind of steel, with which hardness around HRC45 is obtained if tempering is performed by setting the heating temperature to 30° C. for example in a conventional furnace, was used as the material of a half-finished stabilizer.

Figure 7:
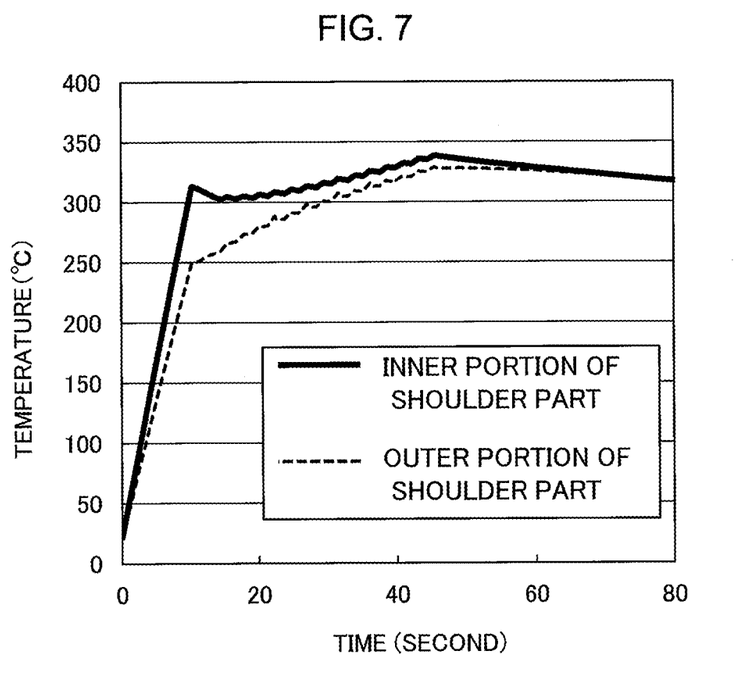
FIG. 7 is a diagram of graphs representing the temporal change in the temperature at the inner portion and the outer portion of the shoulder part of a present inventive example 11 in which the first heating process and the second heating process were performed in the tempering process in an embodiment example.

Incidentally, in the present inventive example 11, the first heating process and the second heating process were performed on the above-described kind of steel, and as shown in FIG. 7, the conditions of the first heating process and the second heating process were set as described below such that the temperature of the inner portion of the shoulder part becomes 340° C. As a result, hardness around HRC45, which is substantially the same hardness as in the above-described case using a conventional furnace, was obtained. Although the temperature is set differently between the present inventive example 11 and the above-described case using a conventional furnace, the hardness is substantially the same because the heating time is different, as can be understood from a known relational expression of tempering parameters (an expression representing that the tempering hardness is related with the heating temperature and the heating time).

Figure 9:
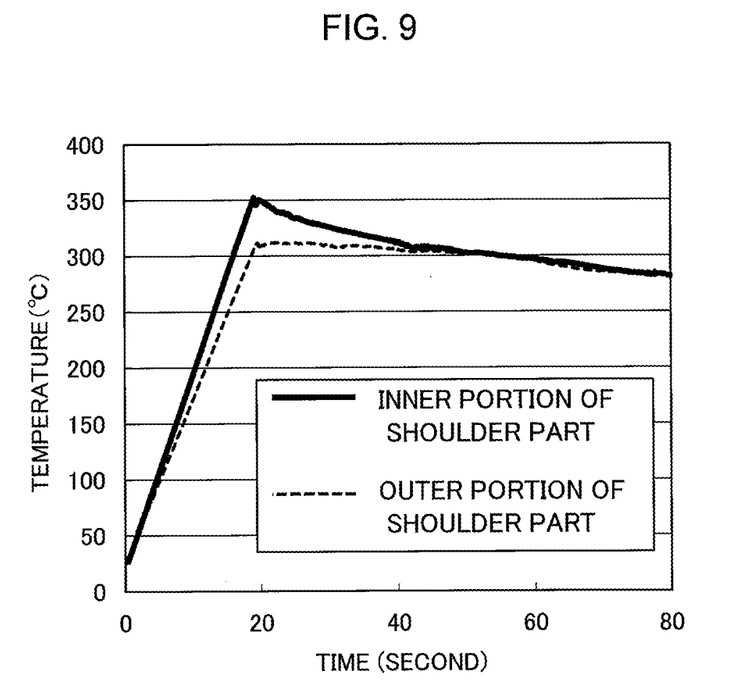
FIG. 9 is a diagram showing the temporal change in the temperatures of the inner portion and the outer portion of the shoulder part of a comparative example 11 for which only the first heating process was performed in the tempering process in an embodiment example.

In the present inventive example 11, in the first heating process, the current application termination time T1 was set to 10.2 sec, the current value I1 was set to 4.4 kA, the slope time length TS was set to 2 sec, the electric power amount Q1 was set to 275 kVAS (0.0763 kWh); the current-application-off time TO between the first heating process and the second heating process was set to 5 sec; and in the second heating process, the current application termination time T2 was set to 45.5 sec, the current value I2 of the pulse current was set to 2.7 kA, the pulse interval T1 was set to 2 sec, the pulse width TP was set to 0.5 sec, and the electric power amount Q2 was set to 75 kVAS, the total electric amount (Q1+Q2) of the first heating process and the second heating process was set to 350 kVAS. In the comparative example 11, only the first heating process was performed, and as shown in FIG. 9, the respective conditions were set such that the temperature of the inner portion of a shoulder part becomes 350° C. in 20 sec.

(2) Measurement Result

Figure 8:
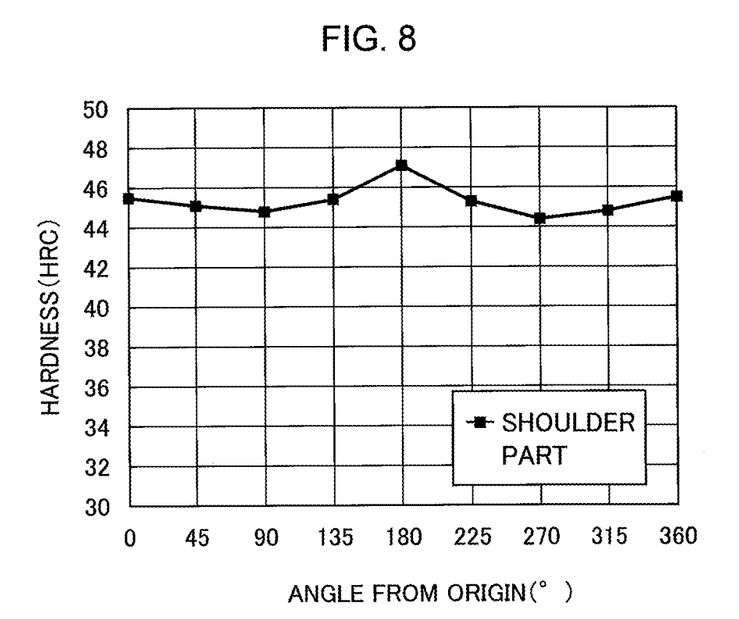
FIG. 8 is a diagram of a graph showing the distribution of hardness at a shoulder part in the present inventive example 11 obtained in the tempering process in an embodiment.
Figure 10:
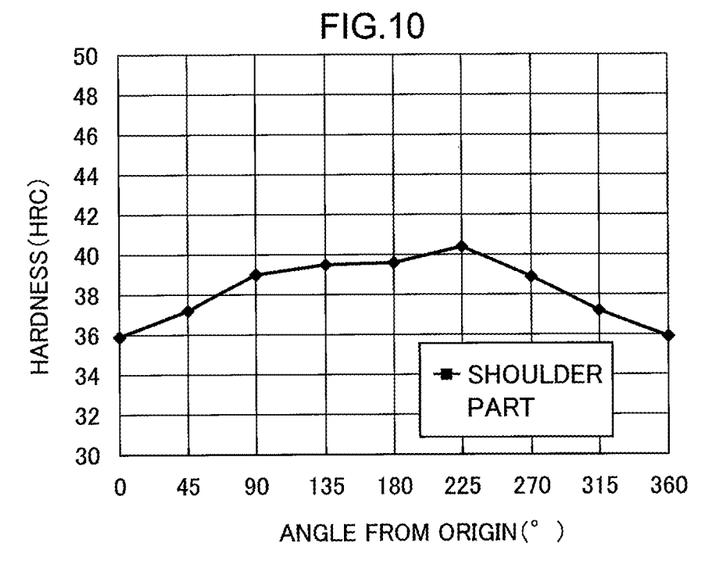
FIG. 10 is a diagram of a graph showing the distribution of hardness at the shoulder part of the comparative example 11 obtained in the tempering process in an embodiment example.

Measurement results of the present inventive example 11 and the comparative example 11 are shown. FIG. 7 shows the temporal change in the temperature at the inner portion and the outer portion of the shoulder part of a half-finished stabilizer in the present inventive example 11. FIG. 8 is a diagram of a graph showing the distribution of hardness at the shoulder part of the half-finished stabilizer in the present inventive example 11. FIG. 9 is a diagram showing the temporal change in the temperatures of the inner portion and the outer portion of the shoulder part of the half-finished stabilizer in the comparative example 11. FIG. 10 is a diagram of a graph showing the distribution of hardness at the shoulder part of the half-finished stabilizer of the comparative example 11.

Figure 6:
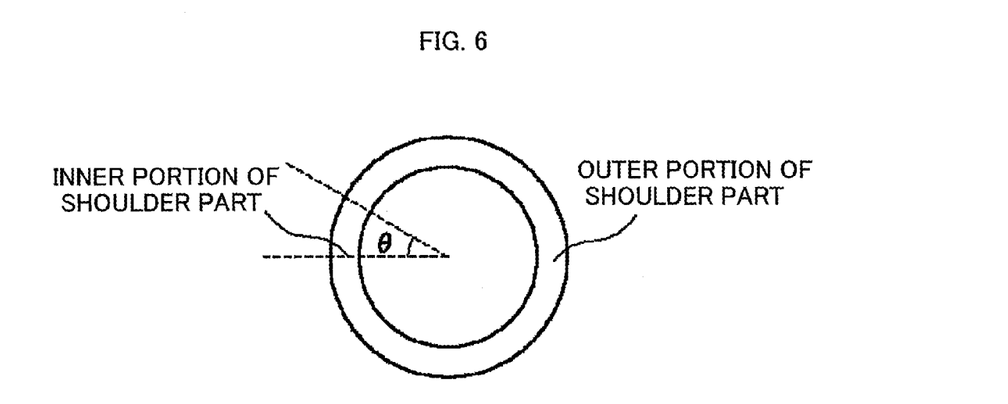
FIG. 6 is a diagram for illustration of the measuring position of the hardness at the shoulder part in the tempering process in an embodiment example.

Incidentally, an angle on the horizontal axis in FIG. 8 or 10 represents a circumferential clockwise position (θ°) with the central point of the inner portion as the origin (0°) in a cross-section (cross-section in the direction perpendicular to the axial line) in the radial direction of the shoulder part shown in FIG. 6, wherein the hardness at 360° is the same as that at the origin (0°). The central point of the inner portion is the point, on the inner portion side, out of the intersection points between the axial direction cross-section and the radial direction cross-section, wherein the axial line direction cross-section includes all of the central axial lines of the torsion part, the arm part, and the shoulder part.

In the comparative example 11, as shown in FIG. 9, the temperature of the inner portion of the shoulder part rapidly rose at a rapid rate up to a temperature close to a target temperature in the first heating process. In the first heating process, the temperature of the outer portion of the shoulder part is lower than the temperature of the inner portion of the shoulder part, which is the shortest route of current, and the temperature difference between the inner portion and the outer portion of the shoulder part became approximately 50° C. However, as the second heating process was not performed, the temperature of the outer portion of the shoulder part did not rise more after the completion of the first heating process. Consequently, the difference between the highest reached temperature of the outer portion of the shoulder part and the highest reached temperature of the inner portion did not become small.

As a result, as shown in FIG. 10, the difference in hardness between the portion with the highest hardness and the portion with the lowest hardness at the shoulder part in the comparative example 11, in which current-application heating was performed only in the first heating process, became higher than 4HRC to be an extremely large value.

On the other hand, in the present inventive example 11, as shown in FIG. 7, the temperature of the inner portion of the shoulder part rapidly rose at a rapid rate up to a temperature close to a target temperature by the first heating process, wherein the temperature of the outer portion of the shoulder part is lower than the temperature of the inner portion, which is the shortest route of current, of the shoulder part, and the difference in temperature between the inner portion and the outer portion of the shoulder part became higher than 50° C. In the current-application-off process between the first heating process and the second heating process, the temperature of the inner portion of the shoulder part dropped, the temperature of the outer portion of the shoulder part rose, and the difference in temperature between the outer portion and the inner portion of the shoulder part became smaller. By the second heating process, while the temperature of the inner portion at the shoulder part gradually rose and became closer to the target tempering temperature, the rate of temperature rise of the outer portion of the shoulder part became higher than that of the inner portion of the shoulder part, and the difference in the temperature between the outer portion and the inner portion of the shoulder part became further smaller to become approximately 10° C. at the completion of the second heating process.

As a result, as shown in FIG. 8, the difference in the hardness at the shoulder part in the present inventive example 11, in which current-application heating was performed in the first heating process and the second heating process, between the highest hardness portion and the lowest hardness portion became approximately 1.5HRC to be an extremely small value.

Figure 11:
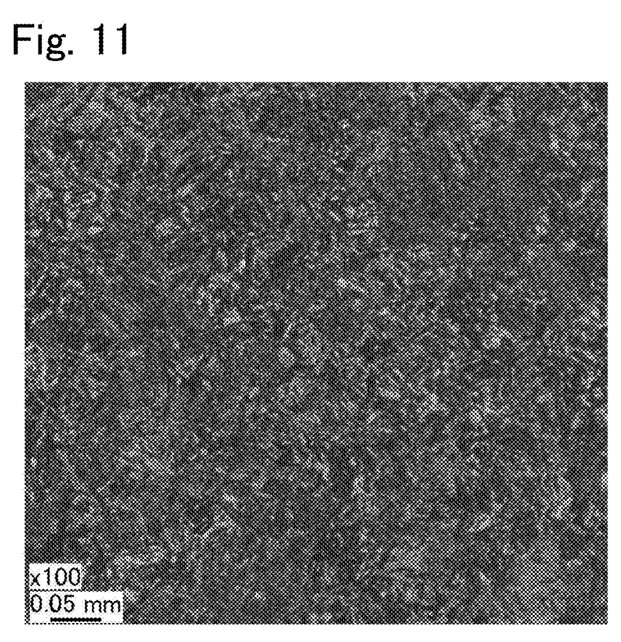
FIG. 11 is a diagram of an optical microscope photograph showing the tempered structure (current-application tempered structure) of a cross-section of the outer portion of the shoulder part of the present inventive example 11 obtained in the current-application tempering process in an embodiment.
Figure 12:
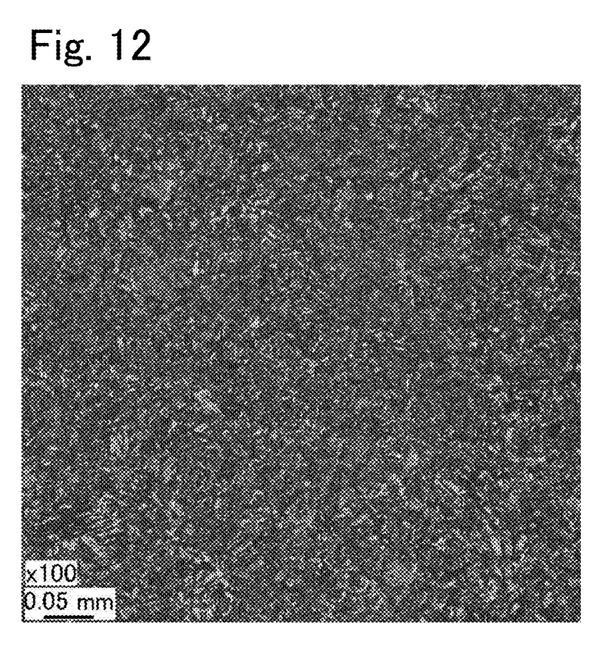
FIG. 12 is a diagram of an optical microscope photograph showing the tempered structure (furnace tempered structure) of a cross-section of the outer portion of the shoulder part of a comparative example 12 obtained by heating by the use of a furnace.

The cross-sectional structure of the shoulder part in the present inventive example 11 was checked. FIG. 11 is a diagram of an optical microscope photograph showing the tempered structure (current-application tempered structure) of a cross-section of the outer portion of the shoulder part of the present inventive example 11. FIG. 12 is a diagram of an optical microscope photograph showing the tempered structure (furnace tempered structure) of a cross-section of the outer portion of the shoulder part of the comparative example 12. In the cross-section of the outer portion of the shoulder part in the present inventive example 11, as understood from FIGS. 11 and 12, it was confirmed that a tempered structure (containing tempered martensite and the like), which is substantially the same as that of the shoulder part in a comparative example 12, was obtained.

As has been described above, in the present inventive example 11 in which current-application heating is performed in the first heating process and the second heating process, the difference in the highest reached temperature between the temperature of the outer portion and the temperature of the inner portion of the shoulder part can be made extremely small, and accordingly, the difference in hardness between the portion with the highest harness portion and the portion with the lowest harness portion of the shoulder part becomes extremely small. Thus, by performing current-application heating in the first heating process and in the second heating process, occurrence of irregularity of hardness at the shoulder part can be reduced. Further, it was confirmed that the tempered structure of the shoulder part in the present inventive example 11 is substantially the same as the tempered structure of the shoulder part in the comparative example 12 in which tempering was performed, using a furnace.

DESCRIPTION OF REFERENCE SYMBOLS

100: stabilizer
100A: half-finished stabilizer
111, 111A . . . torsion part
112, 112A . . . arm part
113, 113A . . . shoulder part (curved part)
113A1 . . . inner portion
113A2 . . . outer portion
200 . . . heating device
201 . . . electrodes
A . . . first heating process
C . . . second heating process

The invention claimed is:

1. A method for manufacturing a stabilizer having a curved part, comprising:
   a tempering process for performing tempering of a half-finished stabilizer by current-application heating,
   wherein a first heating process and a second heating process are sequentially performed in the tempering process,
   wherein current-application heating is performed on the half-finished stabilizer by continuously flowing current to set a temperature of an inner portion in the half-finished stabilizer lower than a target tempering temperature in the first heating process,
   and wherein current application heating is performed on the half-finished stabilizer by intermittently flowing current to raise the temperature of the inner portion in the half-finished stabilizer up to the target tempering temperature in the second heating process.

2. The method for manufacturing a stabilizer according to claim 1,
   wherein a current-application-off process for stopping application of current to the half-finished stabilizer is provided between the first heating process and the second heating process.

* * * * *